US010566111B2

(12) United States Patent
Glew

(10) Patent No.: US 10,566,111 B2
(45) Date of Patent: Feb. 18, 2020

(54) COMMUNICATIONS CABLES HAVING ENHANCED AIR SPACE AND METHODS FOR MAKING SAME

(71) Applicant: CABLE COMPONENTS GROUP, LLC, Pawcatuck, CT (US)

(72) Inventor: Charles A. Glew, Charlestown, RI (US)

(73) Assignee: Cable Components Group, LLC, Pawcatuck, CT (US)

(*) Notice: Subject to any disclaimer, the term of this patent is extended or adjusted under 35 U.S.C. 154(b) by 0 days.

(21) Appl. No.: 15/952,323

(22) Filed: Apr. 13, 2018

(65) Prior Publication Data
US 2018/0301245 A1    Oct. 18, 2018

Related U.S. Application Data

(60) Provisional application No. 62/485,224, filed on Apr. 13, 2017.

(51) Int. Cl.
    *G02B 6/44* (2006.01)
    *H01B 7/42* (2006.01)
    (Continued)

(52) U.S. Cl.
    CPC ............ *H01B 7/423* (2013.01); *G02B 6/443* (2013.01); *G02B 6/4484* (2013.01);
    (Continued)

(58) Field of Classification Search
    CPC ... G02B 6/4429; G02B 6/4459; G02B 6/4435
    See application file for complete search history.

(56) References Cited

U.S. PATENT DOCUMENTS 7,202,418 B2 * 4/2007 Glew .................. G02B 6/4429
                                                        174/113 C
7,256,351 B2   8/2007 Dillon et al.
(Continued)

FOREIGN PATENT DOCUMENTS

CN        201638602 U    11/2010

OTHER PUBLICATIONS

Invitation to Pay Additional Fees (Form PCT/ISA/206) and Communication Relating to the Results of the Partial International Search (Annex to Form PCT/ISA/206) in corresponding PCT Application No. PCT/US2018/027423, dated Jul. 27, 2018, 14 pages.

*Primary Examiner* — Sung H Pak
*Assistant Examiner* — Hoang Q Tran
(74) *Attorney, Agent, or Firm* — Levenfeld Pearlstein, LLC

(57) ABSTRACT

A communications cable is described. The communications cable can include a cable jacket, a separator structure that defines one or more channels for receiving at least one communications medium, and an insulator that surrounds the communications medium. The cable jacket can include one or more corrugations on at least one of its interior or exterior surfaces. The separator can also include one or more grooves on at least a portion of its surface. The insulator can also include one or more indentations on at least one of its interior or exterior surfaces. The corrugations, grooves, and indentations can extend along the longitudinal length of the cable and define one or more air channels for forwarding and circulating air through or on the surface the cable. The circulation of air in the cable can reduce the temperature of the cable and increase the quality of the signal transmitted through the cable.

20 Claims, 10 Drawing Sheets

(51) Int. Cl.

| | | |
|---|---|---|
| *H01B 7/02* | (2006.01) | |
| *H01B 7/17* | (2006.01) | |
| *H01B 11/02* | (2006.01) | |
| *H01B 13/06* | (2006.01) | |
| *H01B 7/18* | (2006.01) | |
| *H01B 3/44* | (2006.01) | |
| *H01B 3/30* | (2006.01) | |
| *H01B 11/06* | (2006.01) | |
| *H01B 7/295* | (2006.01) | |

(52) U.S. Cl.
CPC ............ *G02B 6/4486* (2013.01); *H01B 7/02* (2013.01); *H01B 7/17* (2013.01); *H01B 7/184* (2013.01); *H01B 7/421* (2013.01); *H01B 11/02* (2013.01); *H01B 13/06* (2013.01); *G02B 6/4436* (2013.01); *H01B 3/302* (2013.01); *H01B 3/441* (2013.01); *H01B 3/445* (2013.01); *H01B 7/295* (2013.01); *H01B 11/06* (2013.01)

(56) References Cited

U.S. PATENT DOCUMENTS

| | | | |
|---|---|---|---|
| 2004/0055781 A1* | 3/2004 | Cornibert | ............... H01B 11/06 |
| | | | 174/135 |
| 2005/0269125 A1* | 12/2005 | Clark | ..................... H01B 7/184 |
| | | | 174/113 C |
| 2006/0096777 A1 | 5/2006 | Glew | |
| 2006/0169479 A1 | 8/2006 | Dillon | |
| 2010/0181093 A1 | 7/2010 | Wiekhorst | |
| 2016/0099091 A1 | 4/2016 | Glew | |

\* cited by examiner

COMMUNICATIONS CABLES HAVING ENHANCED AIR SPACE AND METHODS FOR MAKING SAME

PRIOR APPLICATIONS

This application claims the benefit of and priority to U.S. Provisional Application No. 62/485,224, filed on Apr. 13, 2017, the entire teachings of which are incorporated herein by reference.

TECHNICAL FIELD

The present disclosure generally relates to communications cables that can be used to direct data and electrical power, and more particularly, to communications cables having enhanced air space and corresponding methods for making same.

BACKGROUND

Communications cables can be used to direct data and electrical power among the nodes of a communications network. For example, communications cables can be used to transmit and receive data (e.g., among network computers), voice, and control signals (e.g., security signals, fire alarms, temperature control signals, etc.) among the nodes of a communications network.

Communications cables often extend through various infrastructures such as modern residential or office buildings. These cables can be used for a wide range of applications, for example to provide data transmission between computers, voice communications, and control signals (e.g., security signals, fire alarms, temperature control signals, etc.). Such cables can extend throughout buildings, and frequently even through the spaces in the walls, above floors, or in dropped ceilings. Such spaces (e.g., spaces above floors or below ceilings) are commonly referred to as the "plenum area." The plenum area can often include ventilation system components, such as pipes used for directing cool or warm air through buildings and their return air exchange pipes. Communications and electrical cables included in the plenum area are governed by provisions of the National Electric Code ("NEC").

In the event of an electrical fire, flame and potentially hazardous smoke can travel through a plenum area by burning cables (e.g., communications and electrical cables) disposed in that area. Accordingly, building designers often take various precautions to resist the spread of flame (in case of an outbreak of fire) and the generation of and spread of smoke throughout buildings. Further, communications and electrical cables are often designed to protect against loss of life, and minimize costs associated with destruction of cables, electrical components, and other equipment. As detailed in U.S. patent application Ser. No. 14/970,672 and U.S. Pat. No. 6,639,152, the entire teachings of which are incorporated herein by reference, various standards govern the design and use of cables in residential and commercial buildings. These standards often impose stringent requirements on cables used in residential and commercial buildings. For example, in plenum applications for voice and data transmission, electrical conductors and cables should exhibit low smoke evolution, low flame spread, and favorable electrical properties to pass the stringent requirements of copper data cables. Separators, cable jackets, insulations, buffer tubes and blown fiber tubing used in communications cables must also satisfy the standards for flammability and smoke generation. Accordingly, there is a need for an improved communications cable.

The term "transmission modem," as used herein, refers to any modem known and available in the art that can carry data and/or electrical power. The term "about," as used herein, denotes a variation of at most 5%, e.g., of a numerical value.

SUMMARY

The present disclosure relates to communications cables having enhanced air space, which exhibit reduced overall bundle temperatures. In one aspect, a communications cable is disclosed, which comprises at least one transmission medium, a support separator that defines at least one channel for receiving said transmission medium, and a cable jacket that surrounds the support separator and the transmission medium. The cable jacket includes an internal surface having a plurality of corrugations that provide at least one air channel. In some embodiments, each corrugation has a height that is selected such that the cable jacket has a minimum thickness ranging from about 0.010 inches to about 0.013 inches.

In another aspect, another communications cable is disclosed, which comprises at least one transmission medium, an electrical insulation that at least partially surrounds the transmission medium, a support separator that defines at least one channel for receiving the at least one transmission medium, and a cable jacket that surrounds the support separator and the at least one transmission medium. The electrical insulation comprises an internal surface characterized by a plurality of indentations defining at least one air channel.

In yet another aspect, a method for constructing a communications cable is disclosed, which comprises constructing a communications cable having one or more transmission media, a support separator that defines one or more channels for receiving the transmission media, and a jacket surrounding the transmission media and the support separator. The method comprises forming a plurality of corrugations on an interior surface of the jacket, each of the plurality of corrugations having a height selected such that the cable jacket has a minimum thickness ranging from about 0.010 inches to about 0.013 inches and defining at least one air channel for directing air through the communications cable.

In another aspect, a cable jacket for use with a communications cable is disclosed, which comprises a plurality of corrugations disposed on an interior surface of the jacket. The corrugations define at least one air channel that directs air through the communications cable, and each corrugation can have a height that is selected such that the cable jacket has a minimum thickness ranging from about 0.010 inches to about 0.013 inches.

In other examples, any of the aspects above, or any system, method, apparatus described herein can include one or more of the following features.

A minimum average thickness of the cable jacket can range from 0.010 inches to 0.008 inches. In some embodiments, the plurality of corrugations can be spaced evenly on said internal surface of the cable jacket. Further, in some embodiments, the support separator can comprise a central region and a plurality of arms that extend from the central region. The plurality of arms can define at least one channel for receiving the transmission medium. By way of example, the plurality of arms can have a generally T-shaped configuration. In some embodiments, the support separator can comprise one or more grooves disposed along a surface thereof in said at least one channel. The depth of at least one of the grooves can range from about 0.001 inches to about 0.005 inches.

In some embodiments, the support separator can have a generally cross shape defining four symmetric quadrants. Each quadrant can define a channel configured to receive the at least one transmission medium. In some embodiments, the support separator can comprise a plurality of anvil-shaped arms that define two or more regions. Each anvil can be connected to at least one other anvil and each region can include a channel configured to receive the at least one transmission medium. At least two of the two or more regions can be symmetric regions. Alternatively and/or additionally, at least two of the two or more regions can be asymmetric regions. At least one of the plurality of anvils can comprise a generally T-shaped configuration.

As noted above and discussed in further details below, a plurality of corrugations can be formed on a surface of the cable jacket, and/or a surface of an insulation of a transmission medium disposed in the communications cable, and/or on a surface of a separator that defines one or more channels for receiving the transmission medium. By way of example, the plurality of corrugations can comprise at least one of a tooth-shaped structure, a step-shaped structure, a zig-zag shaped structure, a turret-shaped structure, a structure including one or more castellation, or a combination thereof.

The communications cable can further include an electrically insulating material that surrounds said at least one transmission medium. The insulating material can have an interior surface comprising a plurality of indentations that define at least one air channel in proximity of said transmission medium. Each indentation can have a height that is selected such that the insulating material has a minimum thickness ranging from 0.006 inches to 0.10 inches.

A variety of transmission media can be employed in a communications cable according to the various embodiments of the present teachings. By way of example, the transmission medium can comprise an electrically conductive wire. Alternatively or additionally, at least one transmission medium can comprise an optical fiber. At least one of the jacket and/or the support separator, and/or the insulation of the transmission medium can comprise any of a polyolefin, a polyurethane, a polyethylene, a polypropylene, fluorinated ethylene propylene, perfluoroalkoxy alkane, perfluoroalkoxy polymer, engineered resin, or combination thereof. Examples of engineered resins or non-halogenated polymers include, but are not limited to, polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some embodiments, the indentations formed in a cable jacket according to the present teachings can have a width and/or a depth in a range of about 0.001 inches (1 mil) to about 0.005 inches (5 mils). Further, in some embodiments, the indentations formed in a support separator according to the present teachings can have a width and/or a depth in a range of about 0.001 inches (1 mil) to about 0.003 inches (3 mils). Moreover, in some embodiments, the indentations formed in an insulation of a transmission medium according to the present teachings can have a width and/or a depth in a range of about 0.001 inches (1 mil) to about 0.003 inches (3 mils).

In some embodiments, at least one of the jacket and/or the support separator, and/or the insulation of the transmission medium can comprise a polymer blend, i.e., a blend of two or more polymers. By way of example, the polymer blend can be a blend of a fluoropolymer and a plastic polymer, where the plastic polymer is miscible in the fluoropolymer. By way of example, in some embodiments, the fluoropolymer can be a perfluoropolymer. Some examples of suitable fluoropolymers include, without limitation, polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), polyvinylidene fluoride (PVDF), and a combination thereof.

Some examples of suitable plastic polymers include, without limitation, poly ether ketone (PEK), polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

By way of example, a blend of FEP and PEEk, or FEP and PEK, or FEP and PMMA (polymethymethacrylate) can be employed to form any of the support separator, the jacket and/or the insulation of the transmission medium.

In some embodiments, the polymeric material forming any of the jacket, the support separator, and/or the insulation of the transmission medium can be foamed.

Other aspects and advantages of the invention can become apparent from the following drawings and description, all of which illustrate the principles of the invention, by way of example only.

BRIEF DESCRIPTION OF THE DRAWINGS

Features and advantages of the invention described herein, together with further advantages, may be better understood by referring to the following description taken in conjunction with the accompanying drawings. The drawings are not necessarily to scale, emphasis instead is generally placed upon illustrating the principles of the invention

DETAILED DESCRIPTION

Embodiments disclosed herein relate to a communications cable, and particularly a communications cable that exhibits enhanced dissipation of heat generated in transmission media disposed therein. Specifically, embodiments disclosed herein relate to reducing the temperature rise in the burgeoning Power over Ethernet (POE) or Local Area Communication Cabling applications, which can potentially power the internet of everything, from lighting to cameras and wireless access points. The 2017 National Electric Code has incorporated a new Limited Power (LP) Standard for these communications cables for devices utilizing 0.5 Amps to 1 Amp. The test method bundles 192 cables and assesses the heat rise of these cables via seven thermocouples positioned in a vertical plane from the center to the outer ring of the bundle. Temperature rise can affect a four-pair communications cables' signal integrity. Accordingly, by lowering temperature rise in a communications cable, the data signal transmitted using that cable can improve. This can in turn optimize the simultaneous benefit of sending high speed data, as well as power, over these 4-pair LAN cables.

Figure 1A:
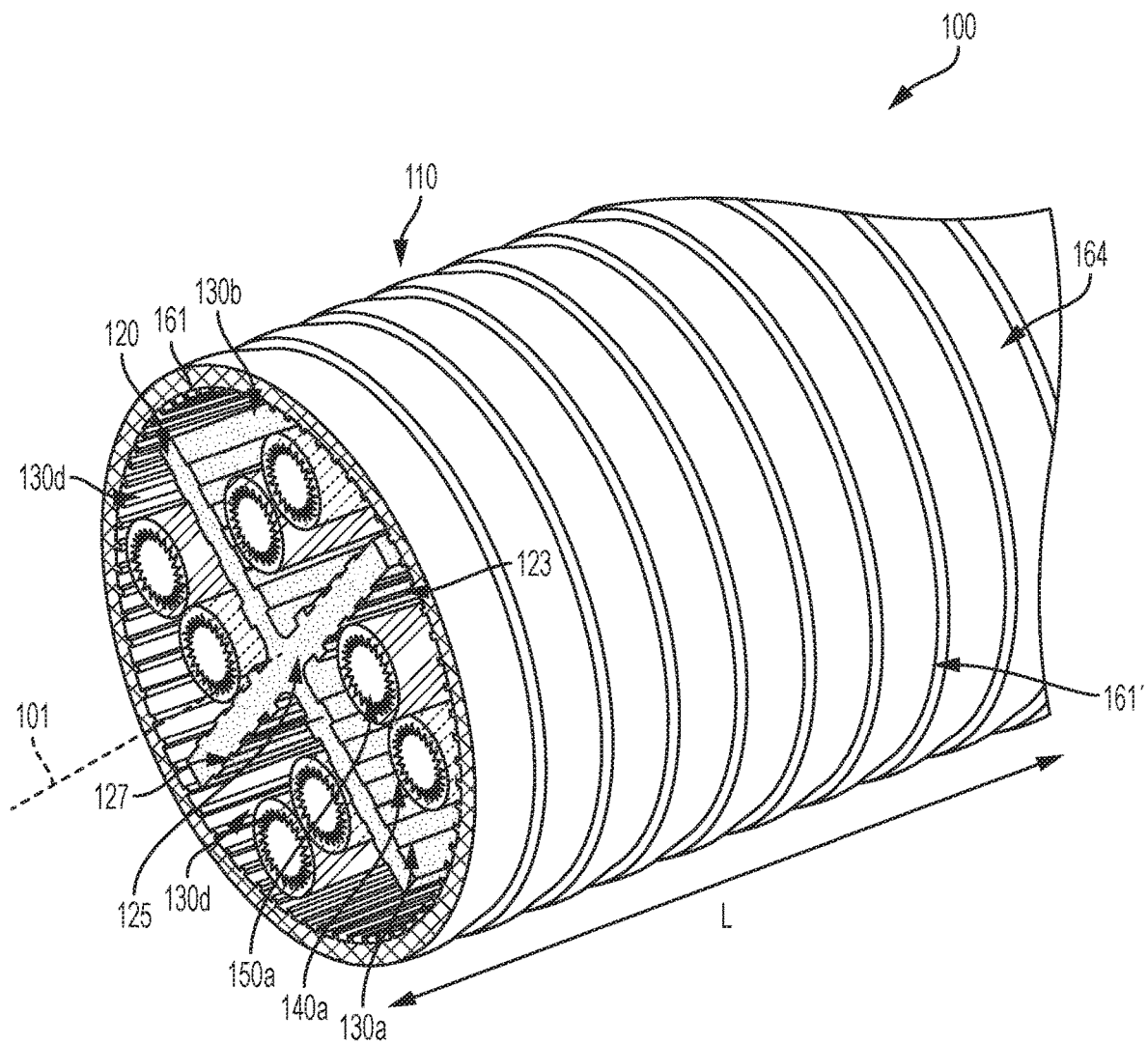
FIG. 1A is a perspective view of a communications cable according to some illustrative embodiments disclosed herein.

FIG. 1A schematically illustrates a communications cable 100 according to some embodiments disclosed herein. The cable 100 can be a cable configured for use in various applications. For example, the cable 100 can be a telecommunications cable, such as a power over Ethernet (POE) cable. Generally, power over Ethernet (POE) cables (e.g., twisted pair Ethernet cables) can safely send and receive electrical power and data among the nodes of a network in which they are disposed. Various standards, such as IEEE 802.3 af-2003, govern the operation of POE systems, and can allow for transmission of up to 15.4 watts of Direct Current (DC) power over POE cables. Other standards, such as IEEE 802.3 at-2009, can provide for transmission of up to 25.5 watts of power, or up to 51 watts of power using two category 5 cables, as outlined in the IEEE 802.3 standard. A variety of polymeric materials, including fluorinated and non-fluorinated polymers, can be employed for fabricating cables according to the present teachings. In some embodiments, cables according to the present teachings can carry electrical currents as high as 1 ampere.

The communications cable 100 can include a jacket 110 and an interior support separator structure 120 (hereinafter "support separator") and have a longitudinal length, L. As described in more details below, the cable jacket can have an exterior surface 164 and one or more exterior corrugations or ribs 161' disposed on its exterior surface 164.

The support separator 120 can extend along the longitudinal axis 101 of the communications cable 100, and include a central region 125 and a plurality of arms 127 that extend from the central region 125. The central region 125 and/or the arms 127 can also extend along the longitudinal axis of the communications cable 100. The central region 125 can include a cavity (not shown in this embodiment) that runs along the length of the support separator 120. The cavity can include a strength member (not shown in this embodiment) that can run the length of the separator 120. By way of example, the strength member can be formed of a solid polyethylene or other suitable plastic, textile (nylon, aramid, etc.), fiberglass flexible or rigid (FGE rod), or metallic material.

The support separator 120 can assume any suitable shape or form known in the art. Although in this illustrative embodiment, the support separator 120 has a cross shape, in other embodiments, it can have other shapes. For example, as described in further details below, the support separator 120 can comprise a plurality of anvil-shaped arms 127 (See, FIG. 1B). The arms 127 can define one or more channels (e.g., channels 130a, 130b, 130c, 130d) that extend along the length of the separator 120. Each channel 130a, 130b, 130c, 130d can receive at least one transmission media 140a, 150b.

The transmission media 140a, 150a can include any suitable transmission medium known in the art. For example, the transmission media can include any transmission media suitable for transmission of current, voice, or data, such as conductors, e.g., insulated twisted pairs. The transmission media 140a, 150a can run along the longitudinal length of the support separator 120 and the communications cable 100. Each channel 130a, 130b, 130c, 130d can include one or more transmission media 140a, 150a (e.g., twisted pairs). The transmission media 140a, 150a can be insulated with any suitable insulator 170 (e.g., polymer) known in the art. For example, the transmission media 140a, 150a can be insulated with a suitable polymer, copolymer, or dual extruded foamed insulation with solid skin surface. In some embodiments, the transmission media 140a, 150a can be used for optical or conventional data transmission. Further, the transmission media 140a, 150a can be configured such that the insulating layer surrounding the transmission media 140a, 150a is physically or chemically bound in an adhesive fashion. Alternatively or additionally, an external insulator film can be wrapped around a transmission media 140a, 150a to provide insulating effects.

Figure 1B:
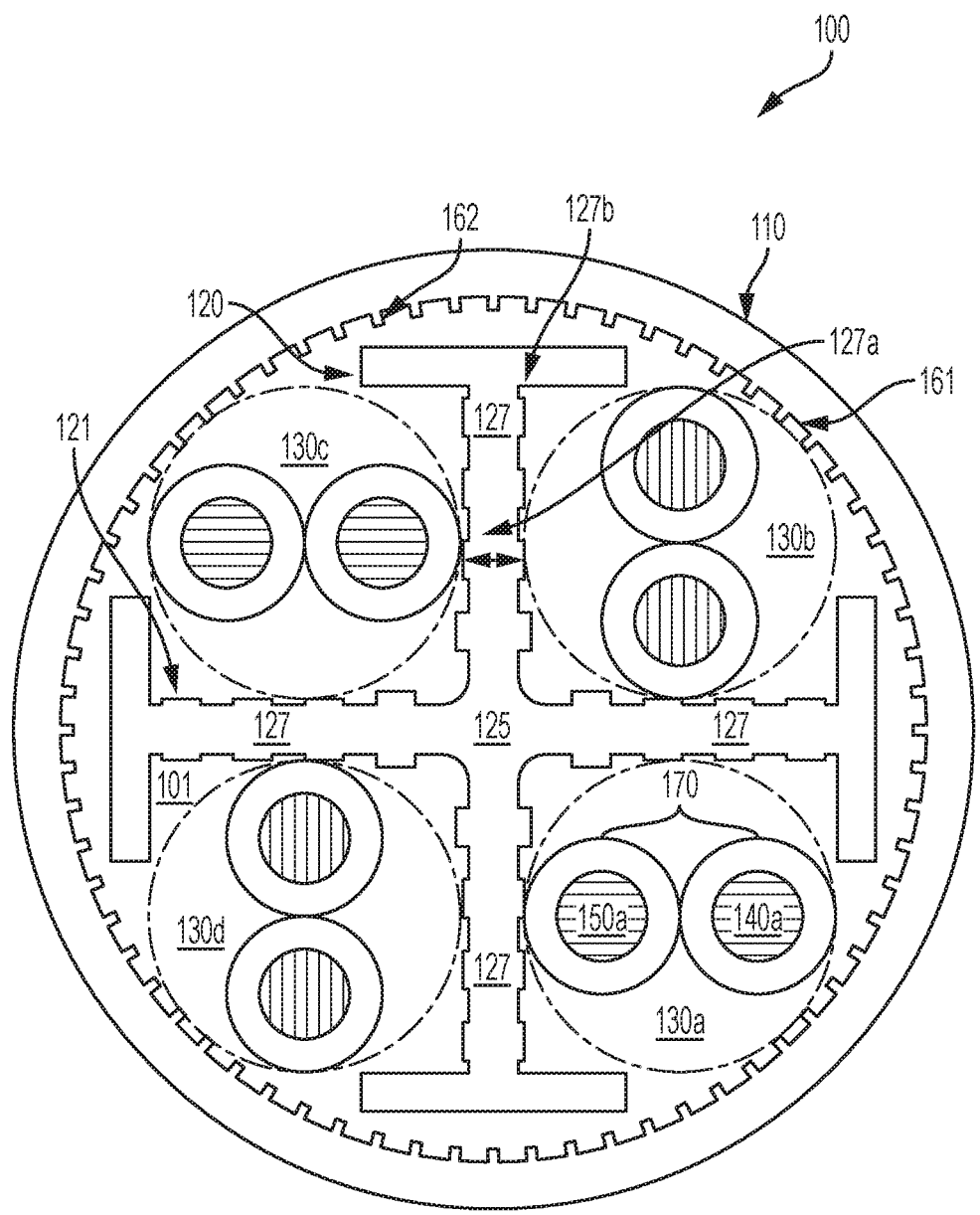
FIG. 1B is a cross-sectional view of the communications cable shown in FIG. 1A.
Figure 1C:
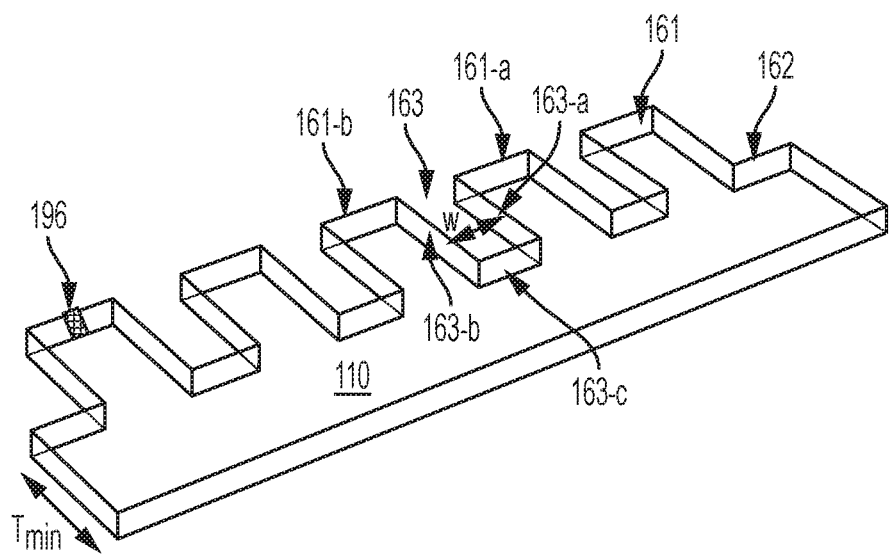
FIG. 1C is a cross-sectional view corrugations formed on an interior surface of the communications cable shown in FIG. 1A.

FIG. 1B is a cross-sectional view of the communications cable 100 illustrated in FIG. 1A and FIG. 1C schematically illustrates corrugations formed on the interior surface of the communications cable. As shown in FIG. 1B, the communications cable 100 can include a jacket 110 that surrounds the various components disposed within the interior cavity 101 of the communications cable 100. The cable jacket 110 can have any suitable shape, size, or thickness available and used in the art. For example, the cable jacket 110 can have a minimum average thickness ranging from 0.008 inches to 0.010 inches. In some embodiments, the cable jacket can have an average thickness of about 0.015 inches.

The cable jacket 110 can be formed from any suitable electrically insulating material known in the art. For example, the cable jacket can comprise any of polyolefin, polyurethane, polyethylene, polypropylene, fluorinated ethylene propylene, perfluoroalkoxy alkane, perfluoroalkoxy polymer, engineered resin, or combination thereof.

The cable jacket 110 can include a plurality of corrugations 161 on its surfaces. For example, in the embodiment shown in FIG. 1B, the cable jacket 110 includes a plurality of corrugations 161 on its internal surface 162. The corrugations 161 can be configured such that they extend along the longitudinal length, L, of the communications cable 100, and define a plurality of air channels 163 (shown in FIG. 1C) that extend, on the internal surface 162 of the jacket 110, along the longitudinal length, L, of the cable 100. The air channels 163 run along the longitudinal length, L, of the cable 100 and facilitate the circulation and transmission of air through the length of the cable 100. The size, shape, dimension, and number of the air channels 163 included in a cable jacket 110 can depend on a particular application for which the cable is intended, and can be delivered by the size, shape, dimension, and the number of corrugations 161 in the cable jacket 110. As shown in FIG. 1C, an air channel 163 can generally be defined by the sidewalls 163-$a$, 163-$b$ which it shares with its adjacent air channels 161-$a$, 161-$b$, and a portion the interior surface of the jacket 163-$c$ that is disposed between the side walls 163-$a$, 163-$b$.

The corrugations 161 can assume any suitable form, shape, or size. For example, the corrugations 161 can be rounded, circular, square-shaped, elliptical, tooth-shaped, step-shaped, zig-zag shaped, turret-shaped, have a structure including one or more castellation, or a combination thereof. In some embodiments, the corrugations 161 can be circular corrugations that are generally perpendicular to the longitudinal axis 101 of the cable 100. Additionally and/or alternatively, the corrugations 161 can all have the same size and/or shape and/or have different sizes and/or shapes. For example, the corrugation 161 can be configured such that each corrugation 161 has a height selected such that the cable jacket 110 has a minimum thickness ranging from 0.010 inches to 0.013 inches. In FIG. 1C, such a minimum thickness is depicted as $T_{min}$. In one embodiment, the corrugations can have a thickness of about 0.003 inches.

The corrugations 161 can be spaced evenly with respect to one another. Alternatively, the corrugations 161 can be spaced unevenly. In some embodiments, the corrugations 161 can be arranged such that some of the corrugations 161 are arranged evenly with respect to one another, while other corrugations are arranged unevenly. The width, w, of each channel 163 can depend on the spacing between its adjacent corrugations 161-$a$, 161-$b$. Generally, the channels can have any suitable width, w. The channels can also have the same/similar widths. Alternatively or additionally, one or more channels can be wider or narrower than other channels. In some embodiments in which corrugations are provided in the cable jacketing, the width of the corrugations can be, for example, in a range of about 0.001 inches (1 mil) to about 0.005 inches (5 mils). Further, in some embodiments in which the corrugations are provided in the support separator, the width of the corrugations can be in a range of about 0.001 inches (1 mil) to 0.003 inches (3 mils). Moreover, in some embodiments in which the corrugations are provided in the insulation of a transmission medium, the width of the corrugations can be, for example, in a range of about 0.001 inches (1 mil) to about 0.003 inches (3 mils).

The corrugations 161 can increase the volume in the cavity 101 of the cable 100 through which air can be circulated and/or transferred. Specifically, the air channels 163, defined by the corrugations 161 (on the interior surface 162 of the cable jacket 110) allow for transmission of air through the interior space 101 of the communications cable 100 defined by the jacket. Therefore, the channels 163 can reduce the temperature in the communications cable 100 by increasing the amount of air that flows through the cable 100, as well as reducing the mass of the cable.

The corrugations 161 can be formed on the interior surface 162 of the jacket 110 using any suitable technique known in the art. By way of example, a jacket according to the present teachings having a plurality of corrugations on an interior surface thereof can be formed via extrusion of a suitable polymeric material, such as the materials discussed herein, over a die having corrugations on its outer surface. Similar process can be used to form corrugated support separations and insulation according to various aspects of the present teachings.

Further, the channels 163 and/or the corrugations 161 can improve the electrical performance of the cable 100, for example by reducing the amount of attenuation of the electric signal being transmitted through the cable 100. Additionally or alternatively, the channels 163 and/or the corrugations 161 can reduce the amount of crosstalk in the cable 100. The channels 163 and/or the corrugations 161 can further include one or more features, such as resistance or strength members 196 that enhances the functions of the cable 100. For example, in some embodiments, one or more channels 163 can include a strength member 196 that runs along the longitudinal length of the channel 163. The strength member can be made from any suitable material known in the art. For example, the strength member can be formed of a solid polyethylene or other suitable plastic, textile (e.g., nylon, aramid, etc.), fiberglass flexible or rigid (FGE rod), or a metallic material.

Although the term jacket is used to describe the element used to surround the various components disposed within the interior cavity 101 of the communications cable 100, it should be appreciated that the jacket can be any cable covering or any means used to insulate and protect the cable. Generally, the cable covering or jacket 110 can be any member that is positioned exterior to the internal cavity 101 and used to insulate the conductors disposed in the internal cavity 101. The type, size, thickness, and material used in the cable jacket can be dictated by factors known in the art, for example by any standard governing manufacture of communications cables.

In addition to or instead of internal corrugations, in some embodiments, the cable jacket 110 can further include one or more ribs or corrugations on its exterior surface 164. For example, as shown in FIG. 1A, the ribs and corrugations 161' can be circular structures that are generally perpendicular to the longitudinal axis of the cable 100.

Figure 1D:
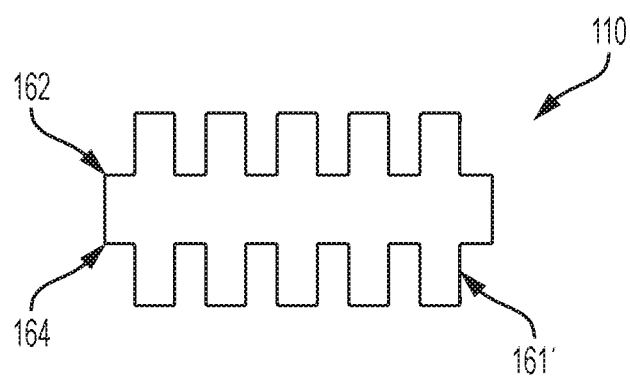
FIG. 1D is an illustrative example of corrugations that can be formed on a cable jacket, according to some embodiments disclosed herein.

FIG. 1D is an illustrative example of such cable jacket 110 having corrugations or ribs 161' on its exterior 164 surface. In certain embodiments, presence or absence of corrugations and/or the type, shape, or size of corrugations 161' included on the exterior surface 164 of the jacket 110 can depend on the nature of installation requirements in which the cable 100 is used. The external corrugations 161' can have similar shapes and widths as those described above in connection with the internal corrugations.

Referring back to FIG. 1B, the arms 127 of the support separator 120 can define one or more channels for receiving transmission media. For example, in the embodiment illustrated in FIG. 1B, the arms 127 of the support separator 120 define four channels 130a, 130b, 130c, 130d. As noted above, each channel can be configured to receive one or more transmission media 140a, 150a. The support separator 120 can have any suitable shape, length, or width. For example, the support separator 120 can be arranged such that it can be confined in a circle that is approximately 0.210 inches in diameter. In one embodiment, the support separator 120 can span a circle that has a diameter of about 0.190 inches. The channels 130a, 130b, 130c, 130d can also have any suitable size or shape. For example, in one embodiment, the channels can have a diameter of about 0.0638 to 0.0828 inches. Generally, the channels 130a, 130b, 130c, 130d are configured such that they provide sufficient space for the transmission media 140a, 150a included therein.

Further, the channels 130a, 130b, 130c, 130d can be positioned from one another in various angles or dimensions. For example, in the example shown in FIG. 1B, the channels 130a, 130b, 130c, 130d are shown 90 degrees apart relative to the center 125 of the support separator 127. The channels can, however, be separated from their adjacent channels at any suitable distance or angle. For example, in one embodiment, at least one channel 130a can be separated from a center of at least one adjacent channel 130b by a distance of about 0.005 inches.

As noted, the arms 127 can assume any suitable shape. For example, as shown in FIG. 1B, at least one arm 127 can include a T-shaped configuration. Specifically, the arm 127 can include a first elongated portion 127a that extends out of the central region 125 of the support separator 127 and a second portion 127b connected to the first elongated portion 127a. In one embodiment, the second portion 127a of the T-shaped configuration can have a width of about 0.010 inches and a length of about 0.065 inches. It should be noted, however, that the arms 127 can assume any suitable shape or size (e.g., width, height, or thickness). For example, in one embodiment, the arms 127 can have a width of about 0.015 inches.

Further, the support separator 120 can include one or more grooves 121 disposed along at least a portion of its surface in at least one channel. Although in the example shown in FIG. 1B the support separator 120 is shown as having grooves 121 disposed along all of its surfaces in the channels 130a, 130b, 130c, 130d, the grooves 121 can be disposed on the surface of the support separator 120 in one or more channels. The grooves 121 can extend along the length of the communications cable 100, support separator 120, and define one or more air channels 123 (shown in FIG. 1A) that facilitates air flow through the communications cable 100. The circulation and transmission of air through the communications cable 100 can, in turn, reduce the temperature rise in the communications cable 100, e.g., due to heat dissipation in the transmission media (e.g., twisted copper pairs, disposed in the communications cable).

Generally, the grooves 121 can have any suitable size or shape. For example, in one embodiment, the depth of at least one of the grooves can range from about 0.001 inches to about 0.005 inches. Further, the grooves 121 can be evenly and/or unevenly distributed on the surface of the support separator 120. The grooves 121 can be disposed along the length of the support separator 120. Furthermore, in some embodiments, the grooves 121 can be disposed along the length of the support separator such that they are perpendicular to the longitudinal axis of the support separator 120. Alternatively, the grooves 121 can be disposed along the length of the support separator at any suitable angle with respect to the longitudinal axis of the support separator 120. In some embodiments, the grooves 121 can be helical.

Figure 2:
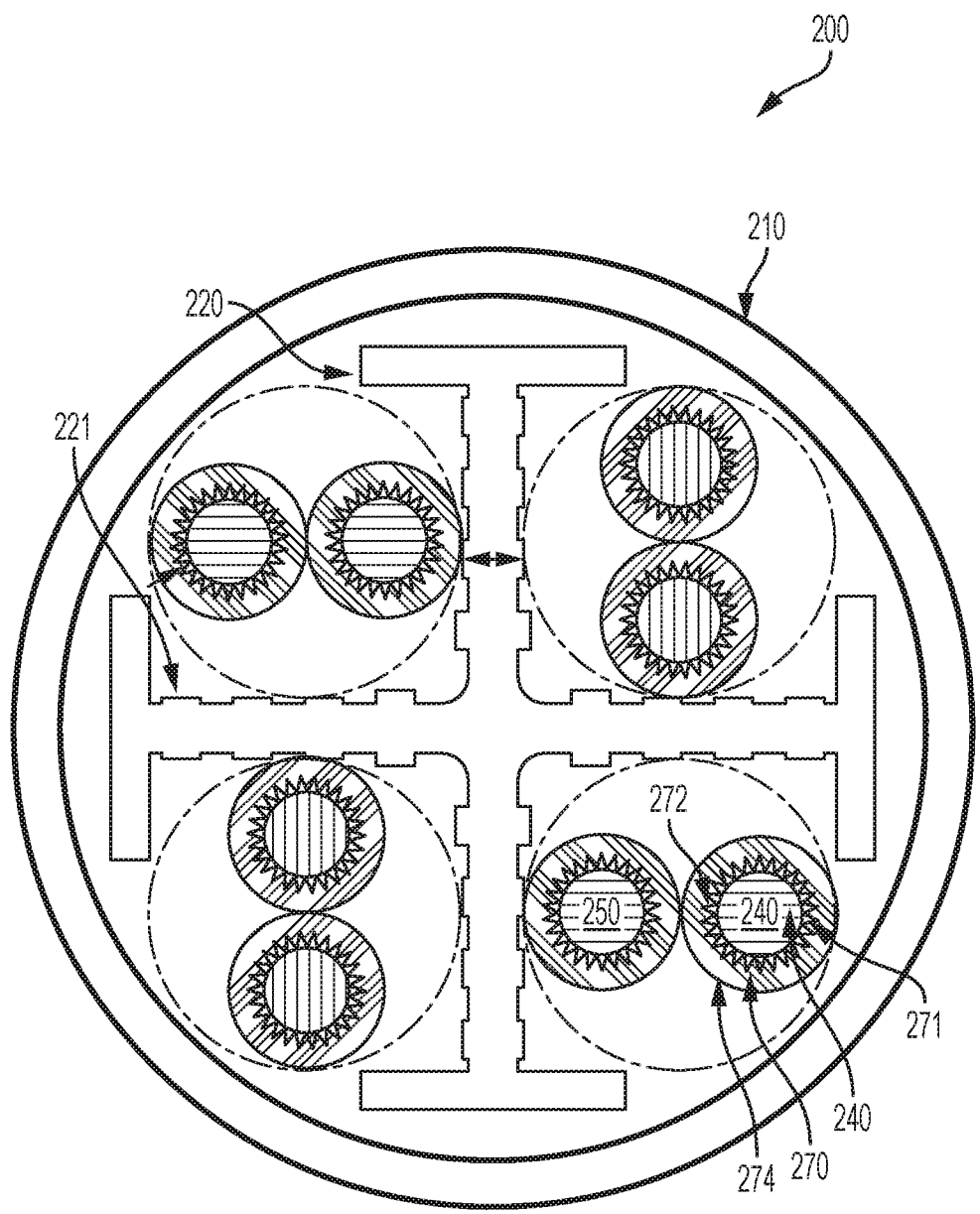
FIG. 2 is a cross-sectional view of a communications cable according to some illustrative embodiments disclosed herein.

As noted above, at least one channel 130a, 130b, 130c, 130d can include at least one transmission medium 140a, 150a. The transmission medium 140a, 150a can be insulated with an insulator 170. FIG. 2 illustrates an example of an insulator 270 according to some embodiments described herein. The insulator 270 can be formed using any suitable insulator material (e.g., polymer, copolymer, or dual extruded foamed insulation with solid skin surface).

The insulator 270 can be configured such that it, at least partially, surrounds the transmission medium 240. The insulator 270 can be coupled to the transmission medium 240 using any suitable technique known in the art. For example, the insulator 270 can be physically or chemically bound around the transmission medium 240 in an adhesive fashion and/or wrapped around the transmission medium 140a.

The insulator 270 can comprise an internal surface 272 and an external surface 274. The internal surface 272 of the insulator 270 can include one or more indentations 271. The indentations 271 can extend along the length of the transmission medium 240 such that they define one or more air channels on the interior surface 272 of the insulator 270, in proximity of the transmission medium 240 and/or along the length of the transmission medium 240. The air channels defined by the indentation 271 can prevent the communications cable 200 from overheating.

The indentations 271 can have any suitable shape, size, or structure. For example, in one embodiment, the indentations 271 can be selected such that the insulator 270 has a minimum thickness of about 0.008 inches. Further, although in the example shown in FIG. 2, every transmission media 240, 250 is shown as being surrounded by an insulator layer 270 having indentations 261, not every transmission media 240, 250 need to be surrounded by an insulator layer 270 and/or an insulator layer including indentations 271. Specifically, in some embodiments, at least one transmission medium 240, 240b can be in at least some part surrounded by an insulator 270. Further, the insulator 270 can include one or more indentations 271 on at least one portion of its internal surface 272. Therefore, certain portions of the internal surface 272 of the insulator 270 can include one or more indentations 271, while other portions can be configured without the indentations.

As noted, the indentations 271 can have any suitable shape or size. Not all indentations 271 included in an insulator 270 need to necessarily have the same size or shape. Further, the indentations 271 included in an insulator 270 can have different shapes and/or sizes. Further, the indentations 271 can be evenly or unevenly spread on the internal surface 272 of the insulator 270.

As noted above, the corrugations 161 included on the interior surface 162 of the jacket (FIG. 1B), the exterior surface of the jacket (FIG. 1D), the grooves 121 disposed on the surface of the support separator 120, and the indentations 271 disposed on the internal surface of the insulator 270 (FIG. 2) can extend along the longitudinal length, L, of the communications cable and define one or more air channels (e.g., air channel 123) for facilitating air flow and hence enhanced heat management. These air channels can expand the air space in the communications cable and/or facilitate circulation of air through the communications cable. As noted, the circulation of air through the communications cable can have a number of benefits. The air circulated through the communications cable by the air channels can reduce the temperature rise in the communications cable. This can be particularly beneficial in POE cables, in which the transmission can be used not only for data transfer but also for transmitting electrical power, the dissipation of which can generate heat, which can, in turn, result in increasing the temperature in the cable. Lowering of temperature in a communications cable can improve the quality of the signal transmitted using that cable (e.g., data signal). Further, this can also optimize the simultaneous benefit of sending high speed data, as well as power, over these 4-pair LAN cables.

Further, a communications cable according to the embodiments can include one or more (e.g., any combination) of the corrugations 161 (FIG. 1B), grooves 121 (FIG. 1B), and/or indentations 271 (FIG. 2). For example, in the illustrative embodiment shown in FIG. 1B, a communications cable 100 having a number of corrugations 161 on the interior surface of the jacket 110 and a number of grooves 121 on the support separator 120 is shown. In the example embodiment shown in FIG. 2, the communications cable 200 includes a number of grooves 221 on the support separator 220 and a number of indentations 271 along the interior surface 272 of insulator 270. However, the jacket 210 does not include any corrugations. Generally, a communications cable according to the embodiments described herein can include any combination and number of corrugations, grooves, and/or indentations.

Figure 3:
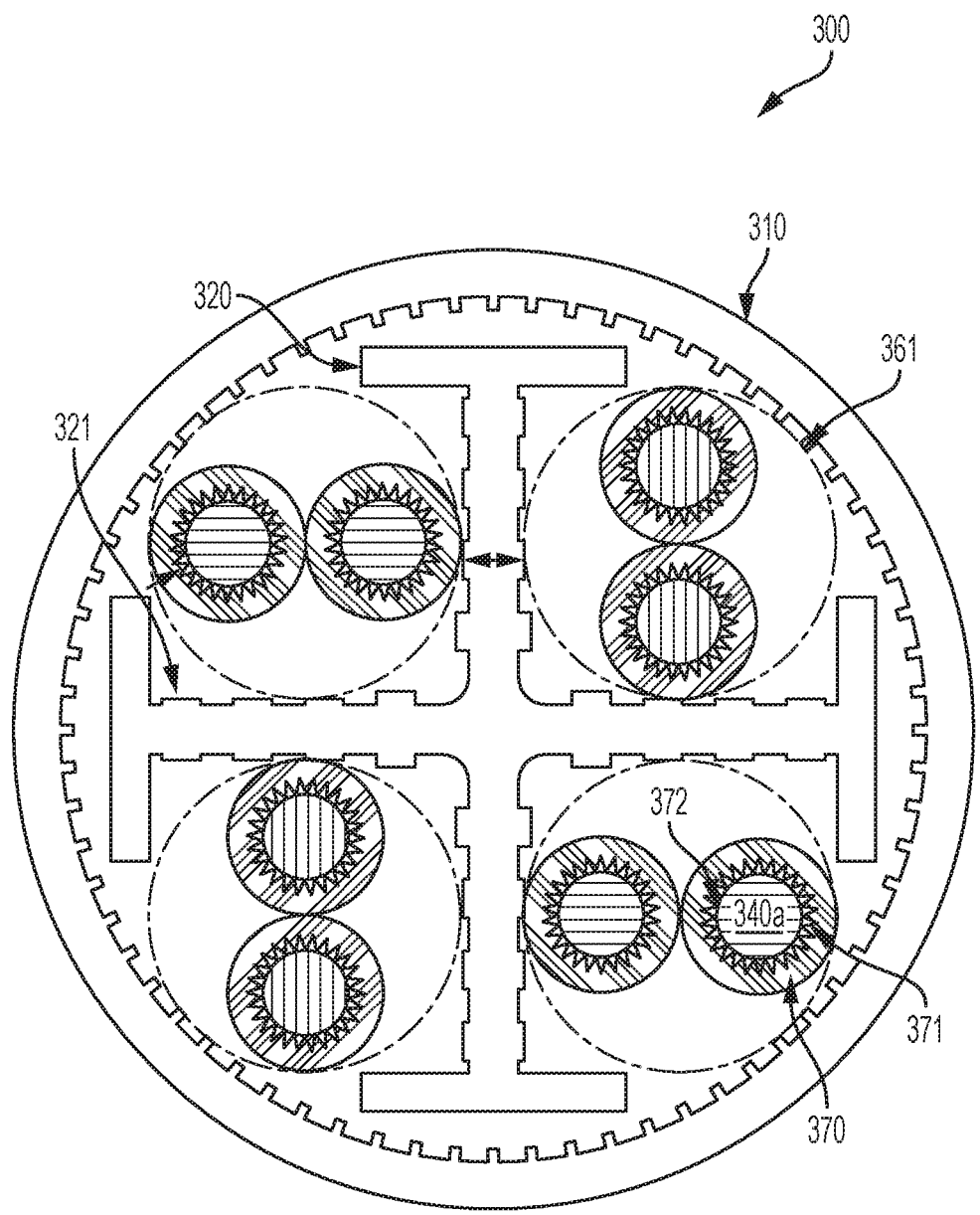
FIG. 3 is a cross-sectional view of a communications cable according to certain illustrative embodiments disclosed herein.

FIG. 3 is an illustrative cross-sectional view of a communications cable 300 according to some embodiments disclosed herein. In the example shown in FIG. 3, the communications cable 300 comprises one or more corrugations 361 on the interior surface of its cable jacket 310. These corrugations 361 can extend along the longitudinal length of the communications cable and define one or more air channels (similar to air channel 123, shown in FIG. 1A) that direct and circulate air through the communications cable 300. The communications cable 300 further includes one or more grooves 321 on the surface of the support separator 320. The grooves 321 can extend along the length of the separator 320 and can define additional air channels that also facilitate the circulation of air through the communications cable 300. The communications cable 300 also includes one or more indentations 371 along at least a portion of the interior surface 372 of at least one insulator 370 used to insulate at least one transmission medium 340a. The indentations 371 can also extend along the length of the communications cable 300 and define additional air channels that can facilitate heat transfer from a transmission medium covered by the insulator to the space surrounded by the cable jacket. As noted above, the air circulated/directed through the communications cable 300 by the air channels formed by the corrugations 361, grooves 321, and the indentations 371 can reduce the temperature rise in the communications cable 300.

As noted above, the corrugations, grooves, and indentations can assume any suitable size, shape, or structure. For example, the corrugations, grooves, and indentations can be rounded, square-shaped, elliptical, tooth-shaped, step-shaped, zig-zag shaped, turret-shaped, or can have a structure including one or more castellation, or a combination thereof.

Figure 4A:
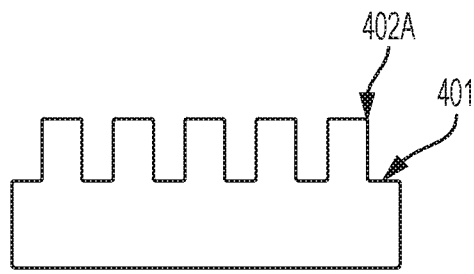
FIG. 4A illustrates an example of a structure that can be assumed by the corrugations, grooves, and indentations described herein.

FIGS. 4A-4E illustrate examples of some of the structures that the corrugations, grooves, and indentations according to the embodiments disclosed herein can assume. For example, FIG. 4A illustrates an embodiment in which at least one of the corrugations, grooves, and indentations (generally illustrated with reference number 402A) assumes a tooth-shaped structure. It should be noted that the teeth 402A need not be all the same size. For example, teeth 402A having different sizes can be employed. Further, although the teeth are shown as being evenly distributed, they can be unevenly distributed. Also, although in this embodiment, the teeth 402A are generally perpendicular to the surface 401, the teeth 402A can make any suitable angle with the surface 401 of the structure upon which they are disposed.

Figure 4B:
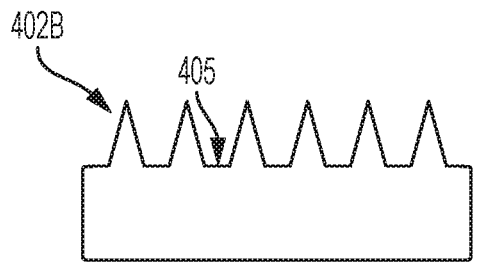
FIG. 4B illustrates another example of a structure that can be assumed by the corrugations, grooves, and indentations described herein.
Figure 4C:
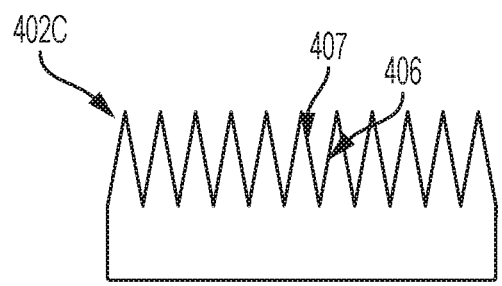
FIG. 4C illustrates yet another example of a structure that can be assumed by the corrugations, grooves, and indentations described herein.

FIGS. 4B-4C are other examples of structures that can be assumed by the corrugations, grooves, and indentations described herein (generally illustrated with reference number 402B). As shown, the corrugations, grooves, and indentations can be zig-zag shaped. As shown in FIG. 4B, the zigzags 402B can be spaced from one another. These spaces 405 can extend along the longitudinal length of the communications cable and define one or more air channels used to facilitate the circulation of air in the communications cable. The spaces 405 can be evenly or unevenly distributed and/or have any suitable size or shape.

Alternatively or additionally, the corrugations, grooves, and indentations (generally illustrated with reference number 402C) can assume a zigzagged shaped structure similar to structures shown in the example in FIG. 4C. In the example shown in FIG. 4C, the air channels can be defined by the walls 406, 407 of the neighboring zigzag structures 402C. The zigzagged shaped structures 402C can be all the same size or have varying sizes.

Figure 4D:
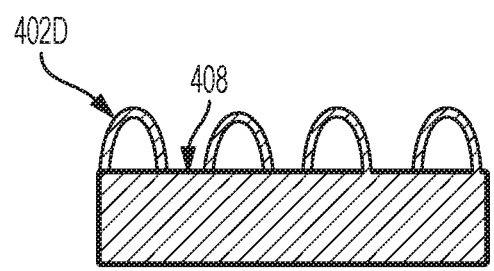
FIG. 4D illustrates another example of a structure that can be assumed by the corrugations, grooves, and indentations described herein.
Figure 4E:
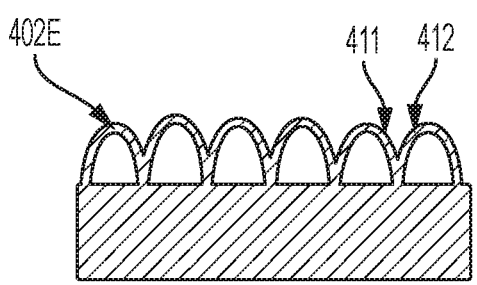
FIG. 4E illustrates yet another example of a structure that can be assumed by the corrugations, grooves, and indentations described herein.

FIGS. 4D-4E illustrate yet other examples of structures that can be assumed by the corrugations, grooves, and indentations described herein (generally illustrated with reference number 402D). As shown, the corrugations, grooves, and indentations can be elliptical or rounded. As shown in FIG. 4D, the rounded structures 402D can be spaced from one another. These spaces 408 can extend along the longitudinal length of the communications cable and can define one or more air channels used to circulate air in the communications cable. The spaces 408 can be evenly or unevenly distributed and/or have any suitable size or shape.

Alternatively or additionally, the corrugations, grooves, and indentations (generally illustrated with reference number 402E) can assume a rounded or elliptical structure similar to structure shown in FIG. 4E. In the example shown in FIG. 4E, the air channels can be defined by the intersection of the walls 411, 412 of the neighboring elliptical or rounded structures 402e. The rounded or elliptical shaped structures 402E can be all the same size or can have varying sizes.

Figure 5:
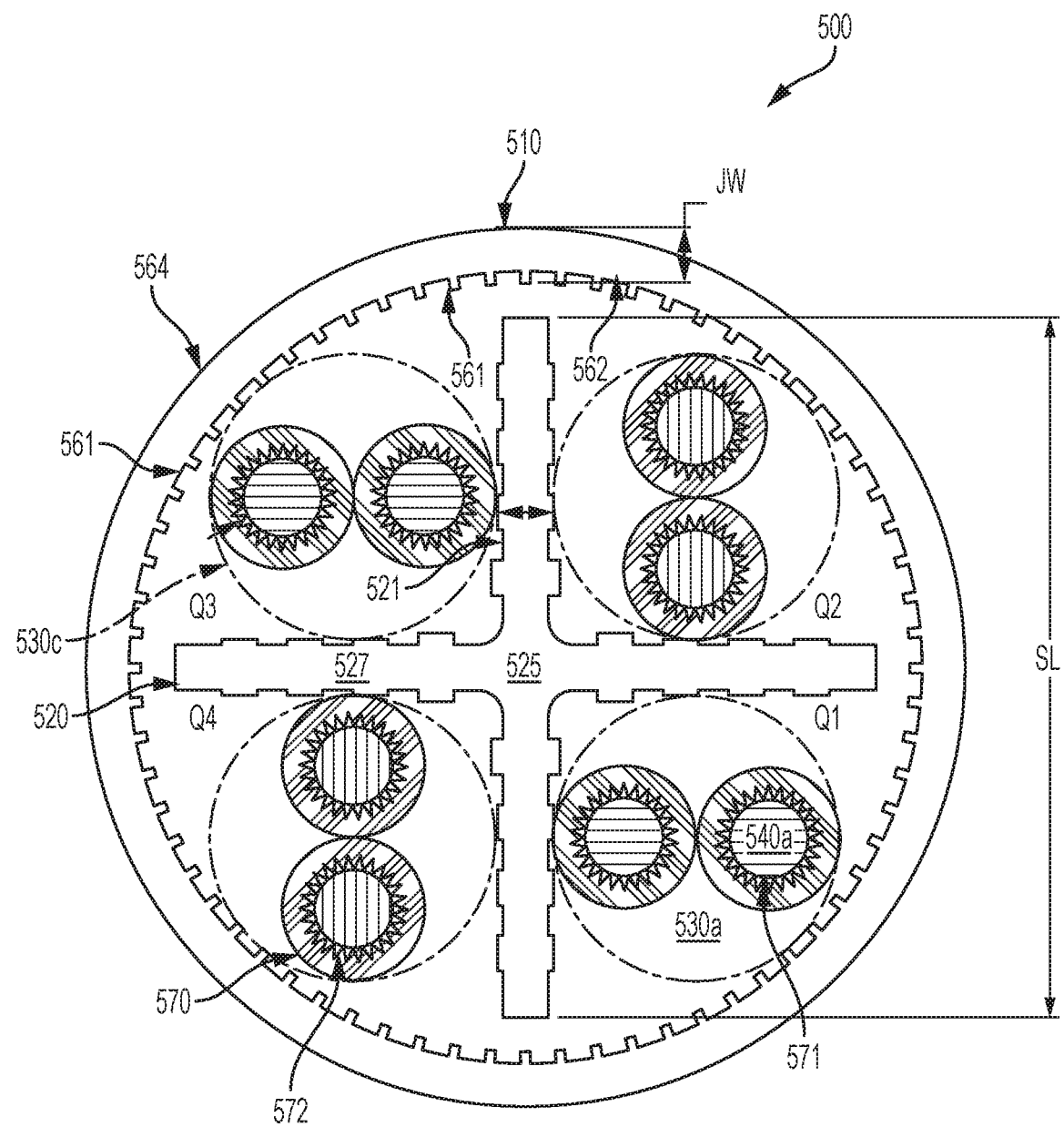
FIG. 5 is a cross-sectional view of a communications cable according to some illustrative embodiments disclosed herein.

FIG. 5 is an illustrative cross-sectional view of a communications cable according to some embodiments disclosed herein. As shown in FIG. 5, the communications cable 500 can include a jacket 510 having a maximum thickness of JW, an exterior surface 564 and an interior surface 562. The maximum thickness, JW, of the jacket 510 can be any suitable thickness. For example, in some embodiments, the maximum thickness of the jacket, JW, can be 0.015 inches. The jacket 510 can have one or more corrugations 561 along its interior surface 562. The corrugations 561 can have any suitable width. For example, the width of the corrugations 561 can be about 0.003 inches. The corrugations 561 can extend along the longitudinal length of the communications cable 500 and define one or more air channels for directing air through the communications cable 500.

The communications cable 500 can further include a support separator 520. As described with reference to FIG. 1B, the support separator 520 can have one or more arms 527 that extend out of the central region 525 of the support separator. The arms 527 can extend along the longitudinal length of the communications cable 500 and define one or more channels (e.g., channels 530a, 530c). Each channel 530a can be configured to receive at least one communication medium 540a. In the example shown in FIG. 5, the arms 527 extend out of the central region 525 in a conventional cross like structure and define four symmetric quadrants Q1, Q2, Q3, and Q4.

As noted previously, the support separator 520 can include one or more grooves 521 disposed along at least a portion of its surface in at least one channel. The grooves 521 can extend along the length of the communications cable and the support separator 520, thereby forming an air channel that can contribute to flame and smoke reduction in the communications cable 100. The support separator 520 can have any suitable length (SL), width, or thickness. For example, in one embodiment, the length, SL, of the support separator can be substantially similar to the length of a communications cable in which the support separator is disposed. In some embodiments, each arm can have a maximum thickness of about 0.015 inches. Similarly, the grooves 521 can have any suitable size or shape. For example, in one embodiment, the grooves can have a depth of about 0.005 inches.

As noted previously, the transmission media (e.g., transmission medium 540a) can be at least partially surrounded by an insulator 570. The insulator 570 can extend along the length of the communications cable 500 and the transmission medium 540a. Further, as noted previously, the insulator 570 can include one or more indentation 571 along its interior surface that also extend along the length of the insulator 570 (and the transmission medium 540a) and define air channels that facilitate circulation and transmission of air through the communications cable 500.

The jacket 510, the insulation material 570, and/or the separator structure 520 can be made from any suitable material known in the art. For example, jacket 510, the insulation material 570, and/or the separator structure 520 can comprise FluoroFoam or perfluoroalkoxy polymer (MFA), Perfluoroalkoxy alkanes (PFA), Heromelt FP Fluorothermoplastics (FEP), and any other suitable polymer.

As noted, the arms 527 of the separator structure 520 can define one or more quadrants Q1, Q2, Q3, or Q4 that include the channels (e.g., 530a or 530c) which can contain one or more transmission media (e.g., transmission medium 540a). Although in the example shown in FIG. 5, the arms 527 are shown as being similarly oriented and similarly-sized arms that define four symmetric quadrants Q1, Q2, Q3, or Q4, the arms 527 can have different sizes and shapes and be arranged such that they result in formation of asymmetric quadrants and/or quadrants having different sizes.

Figure 6:
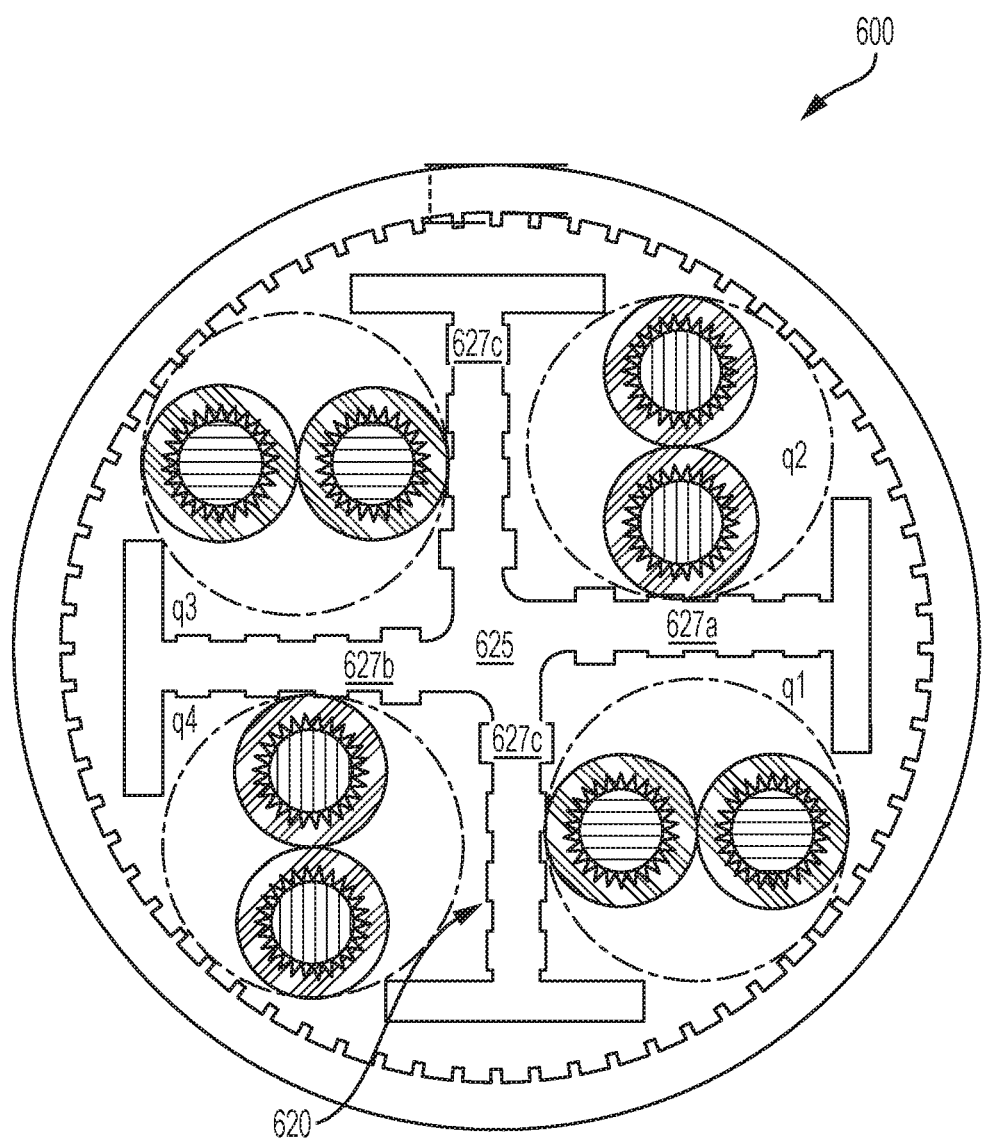
FIG. 6 is a cross-sectional view of a communications cable according to some illustrative embodiments disclosed herein.

FIG. 6 is an illustrative cross-sectional view of a communications cable 600 having asymmetric quadrants q1, q2, q3, and q4. Specifically, in the embodiment illustrated in FIG. 6, T-shaped arms 627a, 627b, 627c, 627d extend from a central region 625 of the support separator 620 such that the resulting quadrants q1, q2, q3, and q4 are not symmetric about the arms of the support separator 627a, 627b, 627c, 627d and/or about the central region 625 of the support separator 620.

Further, the arms 627a, 627b, 627c, 627d can have different sizes and/or shapes, and define quadrants having different sizes and/or shapes. The arms 627a, 627b, 627c, 627d can also extend out of various portions of the central region 625 at different parts of the central region 625, thereby forming asymmetric quadrants (e.g., quadrants q1, q2, q3, q4). Further, the arms 627a, 627b, 627c, 627d can extend out of the central region 625 at different angles (although shown in the examples presented herein as extending perpendicularly out of the central region 625), thereby forming quadrants that are asymmetric and/or have different sizes. In some embodiments, such asymmetric and/or different-sized quadrants can be employed to increase the distance between twisted pairs disposed in different quadrants, thereby reducing cross-talk.

Figure 7:
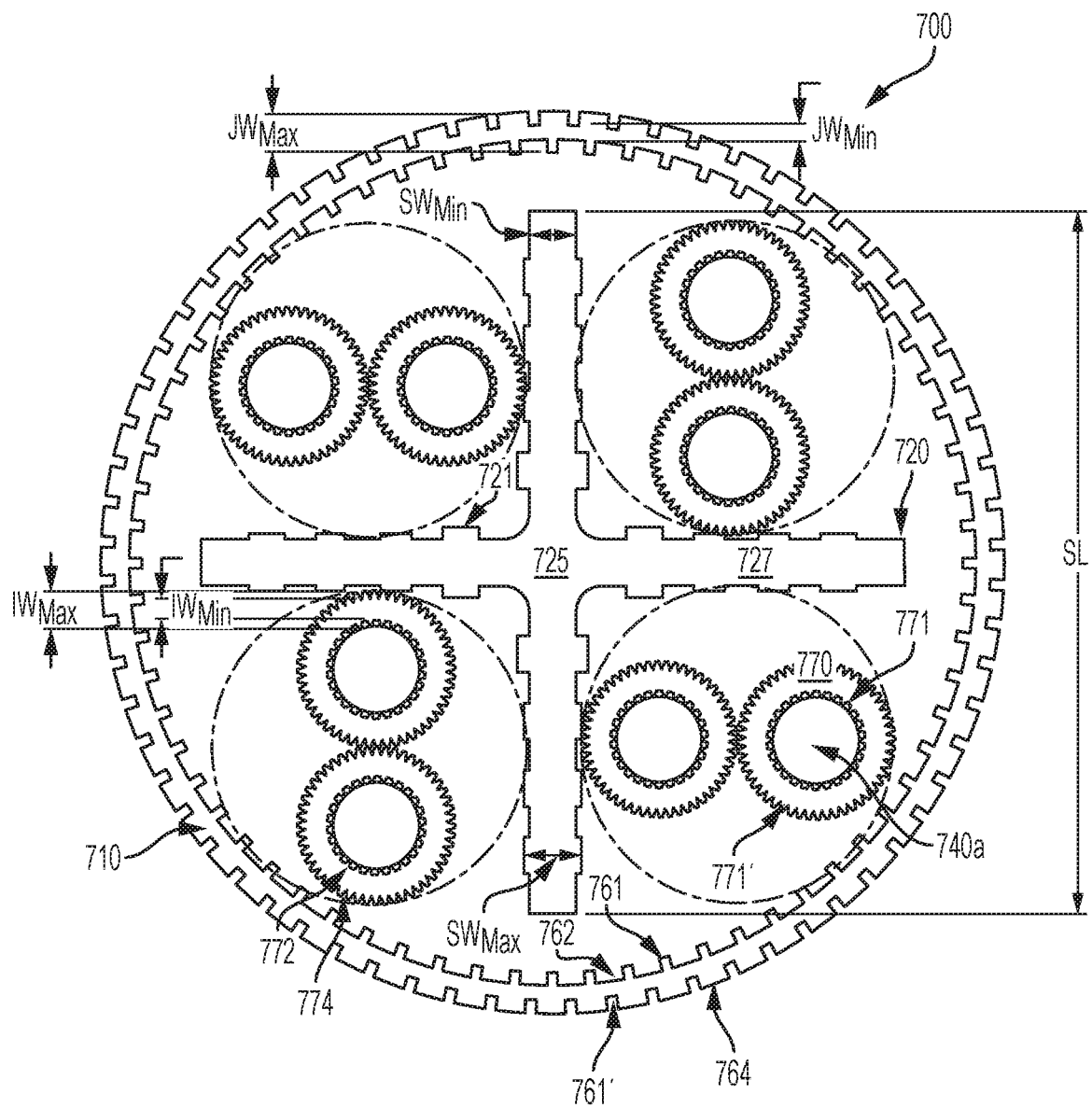
FIG. 7 is a cross-sectional view of a communications cable according to certain illustrative embodiments disclosed herein.

As noted above, the cable jacket can comprise one or more corrugations on its interior surface, its exterior surface, and/or on both its interior and its exterior surfaces. Similarly, the insulator of a transmission medium can include one or more indentations on its interior surface, its exterior surface, and/or on both its interior and its exterior surfaces. FIG. 7 is an illustrative example of another embodiment disclosed herein that illustrates a cable having corrugations 761, 761' and indentations 771, 771' on both the interior and exterior surfaces of its jacket 710 and insulator 770. Specifically, in the embodiment shown in FIG. 7, the communications cable 700 includes a jacket 710 having one or more corrugations 761 on its interior surface 762. The exterior surface 764 of the jacket can also include one or more corrugations 761'. Similar to the corrugations 761 included on the interior surface 762 of the communications cable 700, the corrugations 761' included on the exterior surface 764 of the communications cable 700 can also extend along the longitudinal length of the communications cable 700 and define one or more channels that can forward and transfer air along the longitudinal length of the communications cable 700 (on the exterior surface of the communications cable 700). As noted above, the communications cable 700 can have any suitable width or length. For example, in one embodiment, the jacket 710 of the communications cable 700 can have a minimum thickness of $JW_{min}$ about 0.006 inches and a maximum thickness $JW_{max}$ of about 0.010 inches.

The support separator 720 can have one or more arms 727 extending out of a central region 725. As noted previously, the arms 727 of the support separator 720 can have any suitable size, shape, or thickness known in the art. Further, the support separator arms 727 can widen or narrow as they extend away from the central region 725. For example, at least one arm 727 can be configured to assume a tapered shape such that the width of the arm narrows as the arm extends out of the central region towards the jacket.

Further, the support separator 720 can include one or more grooves 721 on the surface of at least one arm 727. The support separator 720, the arms 727, and the grooves 721 can have any suitable size or shape. For example, in one embodiment, the support separator 720 can have a diameter (SL) of about 1.1 inches to about 2.2 inches, and the arms 727 can have a minimum thickness $SW_{min}$ of about 0.010 inches and a maximum thickness $JW_{max}$ of 0.015 inches.

The insulator 770 used to insulate at least one transmission medium 740a can also include one or more indentations on its interior 772 or exterior 774 surface. Specifically, as shown in FIG. 7, the insulator 770 can include one or more indentations 771 on its interior 772 surface. The insulator 770 can also include one or more indentations 771' on its exterior 774 surface. Similar to the indentations 771 included on the interior surface 772 of the insulator 770, the indentations 771' included on the exterior surface 774 of the insulator 770 can extend along the longitudinal length of the communications cable 700.

The insulator 770 can have any suitable shape or size. For example, in one embodiment, the insulator can have a minimum thickness $IW_{min}$ of about 0.006 inches and a maximum thickness $IW_{max}$ of about 0.10 inches.

A variety of polymeric materials can be employed to form any of a support separator, a cable jacket and/or insulation of a transmission medium disposed in a channel provided by a support separator according to the present teachings. For example, the polymeric material can be a fluoropolymer, such as a perfluoropolymer. Some examples of suitable fluoropolymers include, without limitation, polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), polyvinylidene fluoride (PVDF), and a combination thereof.

Further, as discussed above, the polymeric material can be a blend of two or more polymers. For example, the polymeric material can be a blend of a fluoropolymer and a plastic polymer. Some examples of suitable plastic polymers include, without limitation, poly ether ketone (PEK), polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In some embodiments, the weight concentration of the fluoropolymer in a polymer blend can be at least about 50%. For example, the fluoropolymer can have a concentration in a range of about 50 to about 90 weight percent of the composition. By way of example, in some embodiments, the fluoropolymer has a concentration in a range of about 60 to about 80 weight percent of the composition. In some embodiments, the fluoropolymer has a concentration in a range of about 50 to about 75 weight percent of the composition.

In some embodiments, the weight concentration of the plastic polymer in a polymer blend can be in a range of about 10 to about 50 percent. By way of example, the plastic polymer can have a concentration in a range of about 20 to about 40 weight percent, or about 25 to about 35 weight percent of the composition.

In some embodiments, any of a support separator, a cable jacket and/or insulation of a transmission medium disposed in a channel provided by a support separator according to the present teachings can be formed of a foamed polymer. For example, in some embodiments, any of the support separator, the cable jacket and/or insulation can be formed by foaming any of the polymers listed above, such as perfluoroalkoxy polymer (MFA), perfluoroalkoxy alkanes (PFA), Heromelt FP Fluorothermoplastics (FEP), and any other suitable polymer. By way of example, compositions containing such polymers and a foaming agent, e.g., talc or a talc derivative, can be heated and extruded to form the desired foamed structures. By way of example, U.S. Pat. No. 7,968,613, herein incorporated by reference, discloses various foaming agents and methods suitable for foaming polymers. In some embodiments, the combination of talc and a citrate compound can function as a foaming agent. By way of example, a composition containing a polymer, talc and a citrate compound can be heated and extruded to form a foamed polymeric structure. In some such embodiments, the talc (or talc derivative) can have a weight concentration in a range of about 1% to about 25%, such as a concentration of about 3% to about 20%, or in a range of about 5% to about 15%, or in a range of about 7% to about 10%. Further, the weight concentration of the citrate compound can be, for example, in a range of about 0.01% to about 1%, or in a range of about 0.02% to about 0.9%, or in a range of about 0.03% to about 0.8%, or in a range of about 0.04% to about 0.7%, or in a range of about 0.05% to about 0.6%, or in a range of about 0.06% to about 0.5%. In some such embodiments, the weight concentration of the base polymer (i.e., a blend of a fluoropolymer and a plastic polymer) can be, for example, in a range of about 40% to about 95%, e.g., in a range of about 50% to about 85%, or in a range of about 60% to about 75%. In some such embodiments, the citrate compound can be a citrate salt. Some suitable examples of citrate salts include, without limitation, calcium citrate, potassium citrate, zinc citrate and combinations thereof.

Figure 8:
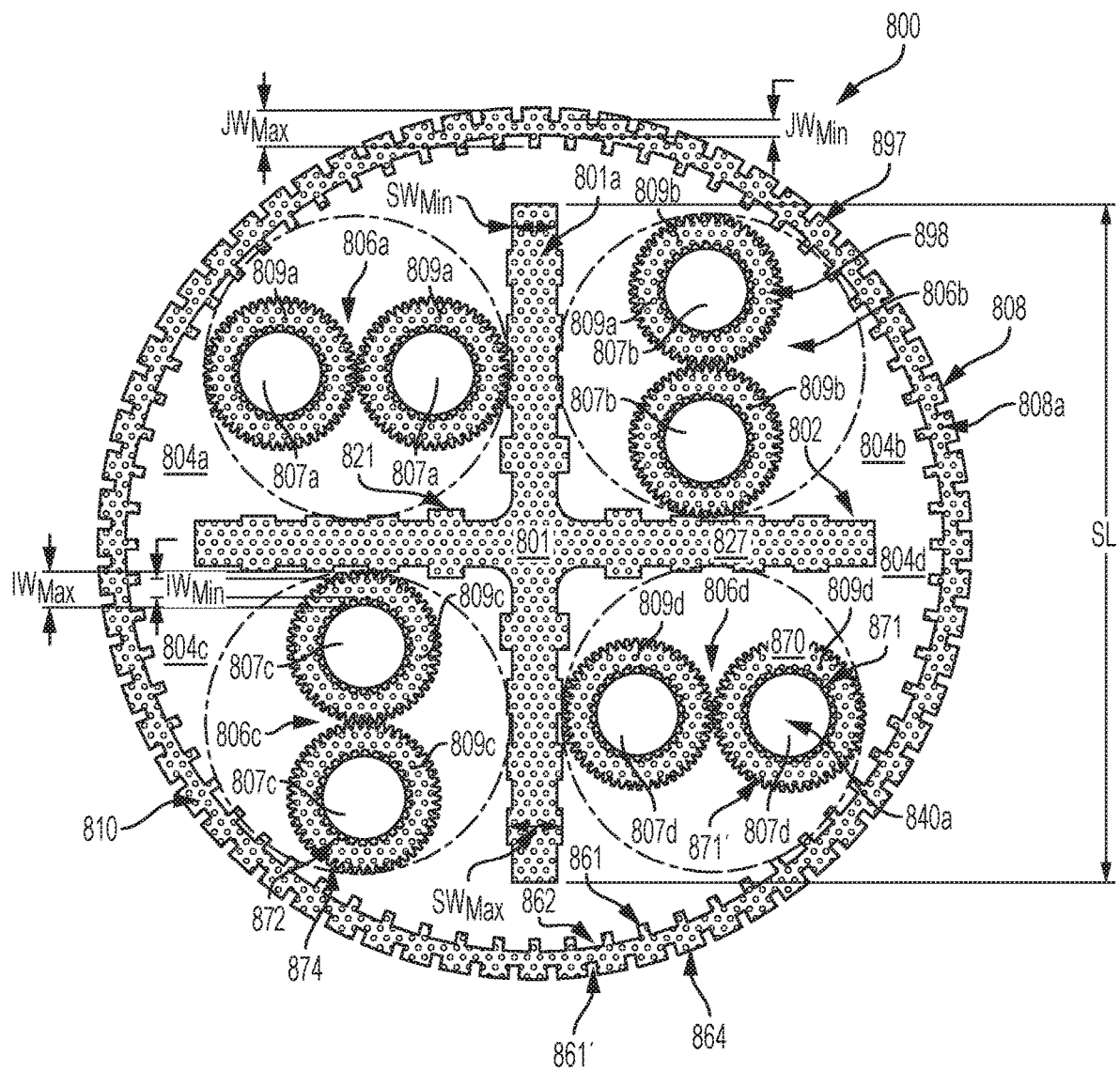
FIG. 8 is a schematic cross-sectional view of a communications cable according to an embodiment of the present teachings.

By way of example, FIG. 8 schematically depicts a communications cable 800 that includes a foamed support separator 801 having a corrugated surface 802, where the support separator 801 provides four channels 804a, 804b, 804c, and 804d in each of which one or more transmission media can be disposed. In this embodiment, transmission media 806a, 806b, 806c, and 806d (for example, in the form of twisted pairs) are disposed in the channels 804a, 804b, 804c, and 804d, respectively. In this embodiment, the transmission media 806a, 806b, 806c, and 806d include a metallic core 807a, 807b, 807c, and 807d surrounded by insulation 809a, 809b, 809c, and 809d (herein collectively insulation 809). A jacket 808 surrounds the support separator and the transmission media. In this embodiment, each of the support separator 801, the insulation 809 and the jacket 808 is formed of a foamed polymer. For example, the support separator 801, the insulation 809 and the jacket 808 include a plurality of cellular structures 801a, 809e, and 808a, respectively, distributed throughout their volume. In some embodiments, the cellular structures can have a size, e.g., diameter, in a range of about 0.0003 inches to about 0.005 inches. Further, the support separator 802, the insulations 809a/809b/809c/809d and/or the jacket 808 can have corrugated surfaces similar to those discussed above in connection with the previous embodiments, which can facilitate the circulation of air through the cable.

The teachings of all patents, published applications and references cited herein are incorporated by reference in their entirety.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A communications cable comprising:
   at least one transmission medium;
   a support separator that defines at least one channel for receiving said transmission medium; and
   a cable jacket that surrounds the support separator and the transmission medium, the cable jacket including an internal surface having a plurality of corrugations providing a plurality of air channels, and
   wherein each corrugation has a height that is selected such that the cable jacket has a minimum thickness ranging from 0.010 inches to 0.013 inches,
   wherein the support separator comprises a central region and a plurality of arms that extend from the central region, the plurality of arms defining said at least one channel for receiving the transmission medium,
   wherein at least one of the plurality of arms comprises a generally T-shaped configuration, the generally T-shaped configuration formed by a first elongated portion extending out of the central region and a second portion connected to the first elongated portion, and wherein at least one air channel of the plurality of air channels extends between the second portion and the cable jacket.

2. The communications cable of claim 1, wherein a minimum average thickness of the cable jacket ranges from 0.010 inches to 0.008 inches.

3. The communications cable of claim 1, wherein the plurality of corrugations are spaced evenly on said internal surface of the cable jacket.

4. The communications cable of claim 1, wherein the support separator comprises one or more grooves disposed along a surface thereof in said at least one channel.

5. The communications cable of claim 4, wherein a depth of at least one of the grooves ranges from 0.001 inches to 0.005 inches.

6. The communications cable of claim 1, wherein the support separator comprises a generally cross shape defining four symmetric quadrants, each quadrant defining a channel configured to receive the at least one transmission medium.

7. The communications cable of claim 1, wherein the support separator comprises a plurality of anvil-shaped arms that define two or more regions, each anvil being connected to at least one other anvil and each region including a channel configured to receive the at least one transmission cable.

8. The communications cable of claim 7, wherein at least two of the two or more regions are symmetric regions.

9. The communications cable of claim 7, wherein at least two of the two or more regions are asymmetric regions.

10. The communications cable of claim 1, wherein the support separator has a circumference ranging between 0.100 and 0.700 inches.

11. The communications cable of claim 1, wherein the plurality of corrugations comprise at least one of a tooth-shaped structure, a step-shaped structure, a zig-zag shaped structure, a turret-shaped structure, a structure including one or more castellation, or a combination thereof.

12. The communications cable of claim 1, further including an electrically insulating material that surrounds said at least one transmission medium, the insulating material having an interior surface comprising a plurality of indentations that define at least one air channel in proximity of said transmission medium.

13. The communications cable of claim 12, wherein each indentation comprises a height selected such that the insulating material has a minimum thickness ranging from 0.006 inches to 0.10 inches.

14. The communications cable of claim 1, wherein said at least one transmission medium comprises an electrically conductive wire.

15. The communications cable of claim 1, wherein said at least one transmission medium comprises an optical fiber.

16. The communications cable of claim 1, wherein at least one of the jacket or the support separator comprises any of a polyolefin, a polyurethane, a polyethylene, a polypropylene, fluorinated ethylene propylene, perfluoroalkoxy alkane, perfluoroalkoxy polymer, engineered resin, or combination thereof.

17. The communication cable of claim 1, wherein at least one of the support separator and the cable jacket is formed from a foamed polymeric material.

18. The communication cable of claim 17, wherein the foamed polymeric material is polyether ether ketone.

19. The communication cable of claim 12, wherein at least one of the support separator, the cable jacket and the electrically insulating material is formed from a foamed polymeric material.

20. A method for constructing a communications cable including one or more transmission media, a support separator that defines one or more channels for receiving the transmission media, and a jacket surrounding the transmission media and the support separator, the method comprising:

forming a plurality of corrugations on an interior surface of the jacket, each of the plurality of corrugations having a height selected such that the cable jacket has a minimum thickness ranging from 0.010 inches to 0.013 inches and the plurality of corrugations defining a plurality of air channels for directing air through the communications cable, wherein the support separator comprises a central region and a plurality of arms that extend from the central region, the plurality of arms defining said at least one channel for receiving the transmission medium, wherein at least one of the plurality of arms comprises a generally T-shaped configuration, the generally T-shaped configuration formed by a first elongated portion extending out of the central region and a second portion connected to the first elongated portion, and wherein at least one air channel of the plurality of air channels extends between the second portion and the cable jacket.

* * * * *

UNITED STATES PATENT AND TRADEMARK OFFICE
CERTIFICATE OF CORRECTION

PATENT NO. : 10,566,111 B2
APPLICATION NO. : 15/952323
DATED : February 18, 2020
INVENTOR(S) : Charles A. Glew It is certified that error appears in the above-identified patent and that said Letters Patent is hereby corrected as shown below:

In the Specification
1. In Column 3, Line 52, delete "polypheylsulfone" and insert -- polyphenylsulfone --, therefor.
2. In Column 3, Line 55, delete "polyproplylene" and insert -- polypropylene --, therefor.
3. In Column 4, Line 31, delete "PEEk," and insert -- PEEK, --, therefor.
4. In Column 4, Line 50, delete "invention" and insert -- invention. --, therefor.
5. In Column 5, Line 55, delete "power" and insert -- Power --, therefor.
6. In Column 5, Line 56, delete "power" and insert -- Power --, therefor.
7. In Column 5, Line 62, delete "power over POE" and insert -- Power over Ethernet (POE) --, therefor.
8. In Column 6, Line 35, delete "150b." and insert -- 150a. --, therefor.
9. In Column 8, Line 57, delete "exterior 164 surface." and insert -- exterior surface 164. --, therefor.
10. In Column 9, Line 21, delete "support separator 127." and insert -- support separator 120. --, therefor.
11. In Column 10, Line 38, delete "240b" and insert -- 250 --, therefor.
12. In Column 16, Line 35, delete "support separator 802," and insert -- support separator 801, --, therefor.

In the Claims
13. In Column 18, Line 13, in Claim 17, delete "communication" and insert -- communications --, therefor.
14. In Column 18, Line 16, in Claim 18, delete "communication" and insert -- communications --, therefor.
15. In Column 18, Line 19, in Claim 19, delete "communication" and insert -- communications --, therefor.

Signed and Sealed this
Seventh Day of July, 2020

Andrei Iancu
*Director of the United States Patent and Trademark Office*